United States Patent
Wada

(10) Patent No.: US 12,176,548 B2
(45) Date of Patent: Dec. 24, 2024

(54) FUEL CELL CATALYST COMPOSITION AND FUEL CELL CONTAINING SAME

(71) Applicant: TOYO UNIVERSITY, Tokyo (JP)

(72) Inventor: Noboru Wada, Kawagoe (JP)

(73) Assignee: TOYO UNIVERSITY, Tokyo (JP)

( * ) Notice: Subject to any disclaimer, the term of this patent is extended or adjusted under 35 U.S.C. 154(b) by 412 days.

(21) Appl. No.: 17/618,185

(22) PCT Filed: Jul. 1, 2020

(86) PCT No.: PCT/JP2020/025882
§ 371 (c)(1),
(2) Date: Dec. 10, 2021

(87) PCT Pub. No.: WO2021/010167
PCT Pub. Date: Jan. 21, 2021

(65) Prior Publication Data
US 2022/0271297 A1    Aug. 25, 2022

(30) Foreign Application Priority Data

Jul. 12, 2019  (JP) ................. 2019-130040

(51) Int. Cl.
*H01M 8/086* (2016.01)
*H01M 4/86* (2006.01)
(Continued)

(52) U.S. Cl.
CPC ....... *H01M 4/9016* (2013.01); *H01M 4/8673* (2013.01); *H01M 4/9083* (2013.01); *H01M 8/086* (2013.01); *H01M 8/1018* (2013.01)

(58) Field of Classification Search
CPC .......... H01M 4/9016; H01M 4/8673; H01M 4/9083; H01M 8/086; H01M 8/1018
See application file for complete search history.

(56) References Cited

U.S. PATENT DOCUMENTS

| 7,670,585 B2 | 3/2010 | Hosono et al. |
| 2004/0137299 A1* | 7/2004 | Mazza ............... H01M 8/2483 |
| | | 429/514 |

(Continued)

FOREIGN PATENT DOCUMENTS

| CN | 101184697 A | 5/2008 |
| CN | 102171150 A | 8/2011 |

(Continued)

OTHER PUBLICATIONS

Song Chongfu et al.; "Atomic Fluorine Anion Storage Emission Material C12A7-F- and Etching of SiO 2 by Atomic Fluorine Anions" Chmistory of Materials, vol. 20, No. 10. Apr. 30, 2008, pp. 3473-3479, XP5590445; Cited in the extended European search report issued on May 24, 2022.

(Continued)

*Primary Examiner* — James Lee
(74) *Attorney, Agent, or Firm* — METROLEX IP LAW GROUP, PLLC; Robert L. Scott, Esq

(57) ABSTRACT

Provided is a fuel cell catalyst composition comprising a C12A7:X⁻ inorganic material having a structure in which oxygen anions of C12A7 are replaced by halogen (X) anions, or comprising a C12A7:X⁻-based inorganic material which is a C12A7:X⁻ partially converted to electride. A fuel cell comprising the fuel cell catalyst composition in a catalyst layer is also provided. Also provided is a method of producing a fuel cell catalyst composition, comprising a step of heat-treating C12A7:X⁻ at temperature of 1000-1300° C. for at least 20 hours under a nitrogen atmosphere.

15 Claims, 9 Drawing Sheets

(51) Int. Cl.
*H01M 4/90* (2006.01)
*H01M 8/1018* (2016.01)

(56) References Cited

U.S. PATENT DOCUMENTS

| | | |
|---|---|---|
| 2005/0053546 A1 | 3/2005 | Hosono et al. |
| 2006/0151311 A1 | 7/2006 | Hosono et al. |
| 2008/0095688 A1 | 4/2008 | Hosono et al. |
| 2009/0224214 A1 | 9/2009 | Hosono et al. |
| 2011/0182803 A1 | 7/2011 | Ito et al. |
| 2015/0217278 A1 | 8/2015 | Hosono et al. |
| 2018/0044589 A1 | 2/2018 | Watanabe et al. |
| 2018/0186650 A1 | 7/2018 | Hirao et al. |

FOREIGN PATENT DOCUMENTS

| | | |
|---|---|---|
| CN | 107250045 A | 10/2017 |
| JP | 2003-128415 A | 5/2003 |
| WO | 2005/000741 A1 | 1/2005 |
| WO | 2007/060890 A1 | 5/2007 |

OTHER PUBLICATIONS

Jeevaratnam J et al. ; "Anion Substitution and Structure of 12Ca0*7A120" February Journal of The American Ceramic Society-Discussions and Notes, Feb. 1, 1964 , pp. 105-106, XP55920508; Cited in the extended European search report issued on May 24, 2022.

Extended European search report issued on May 24, 2022 in a counterpart European patent application.

Office Action issued on Jan. 4, 2024 in a counterpart Chinese patent application.

* cited by examiner

[Figure 1]
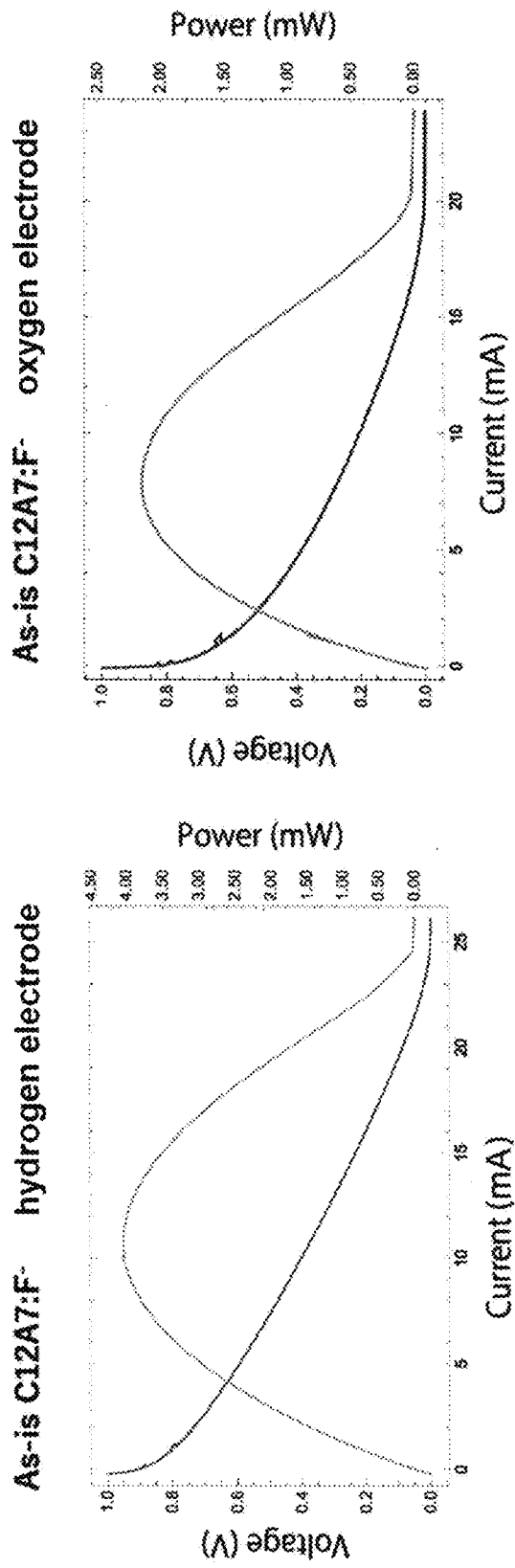

[Figure 2]
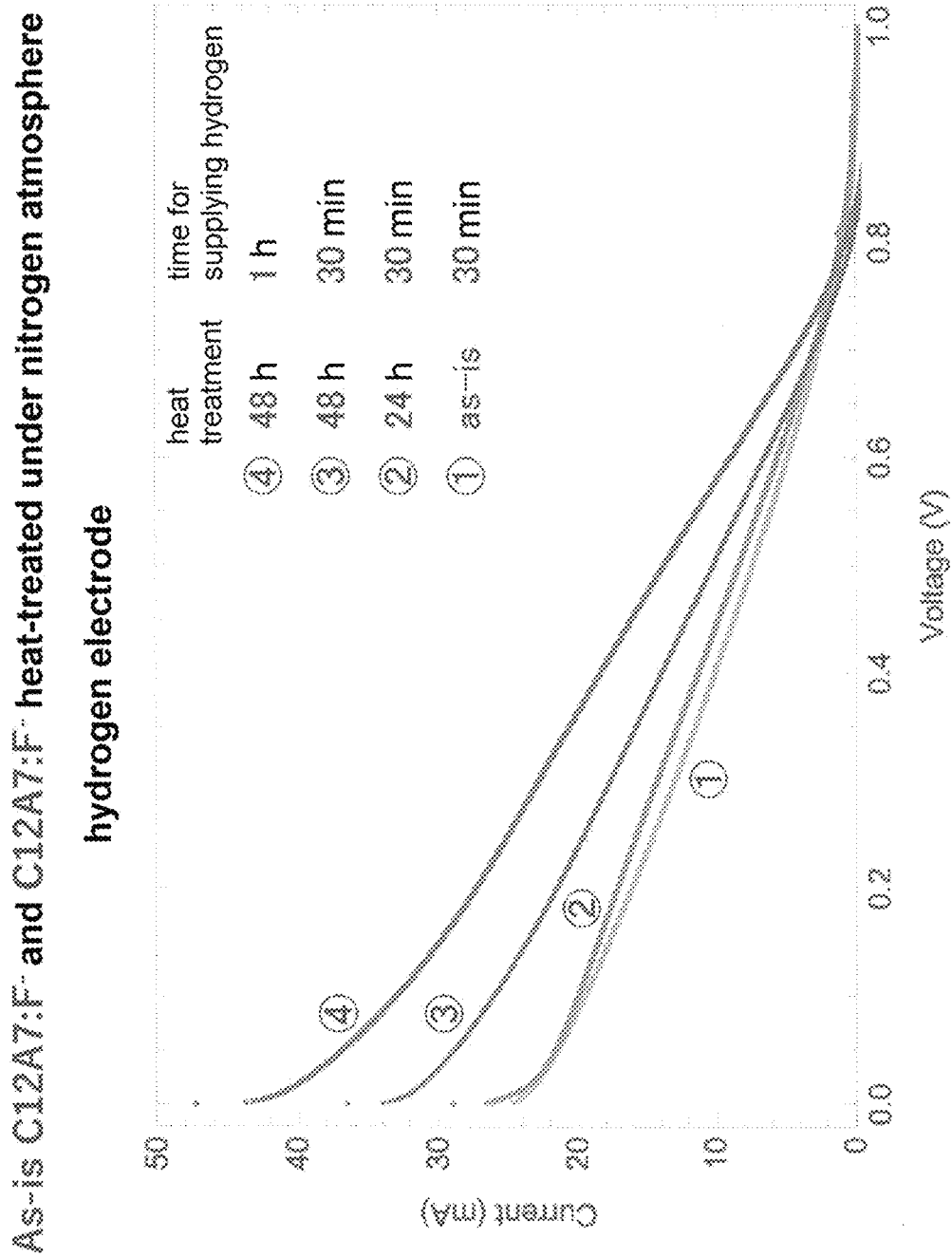

[Figure 3]
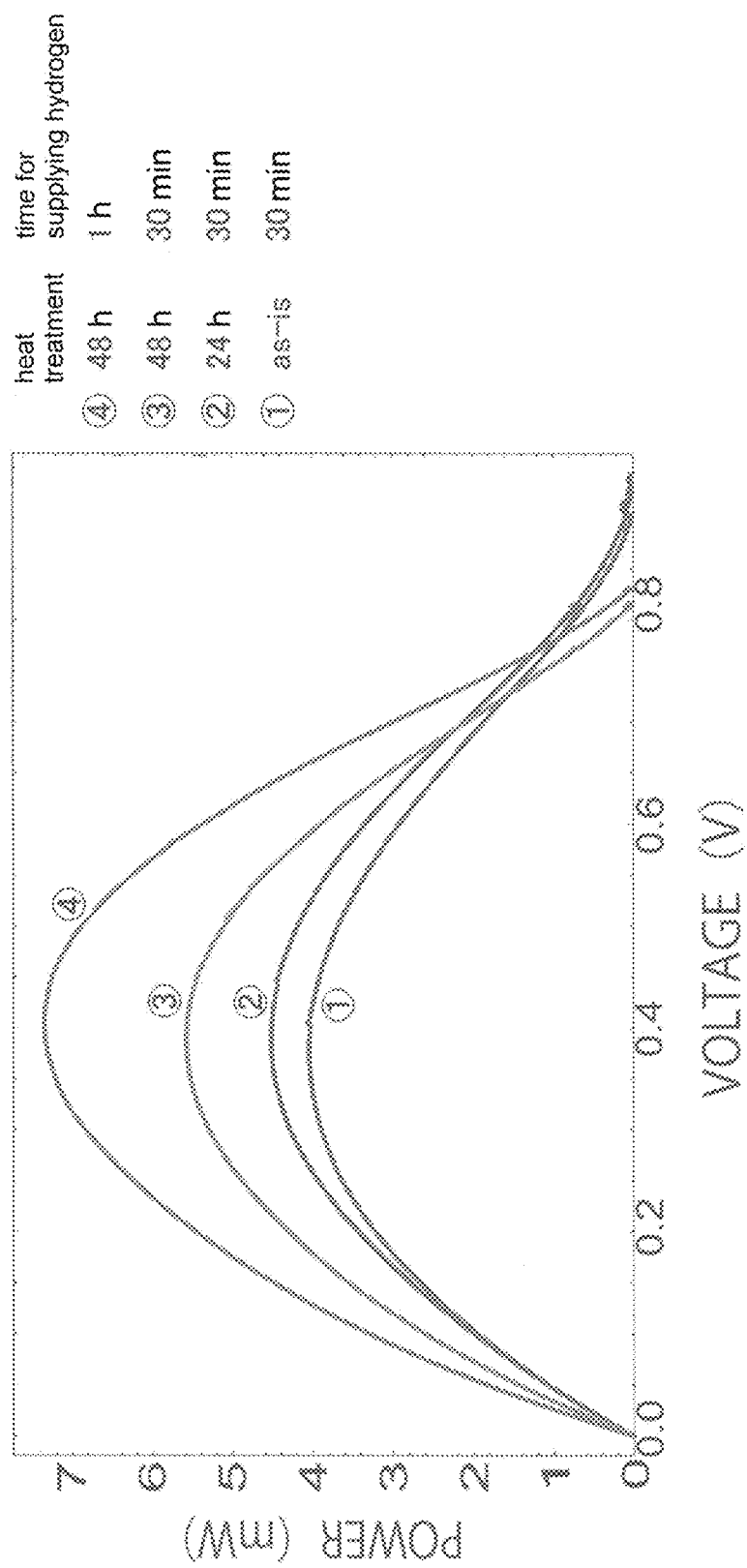

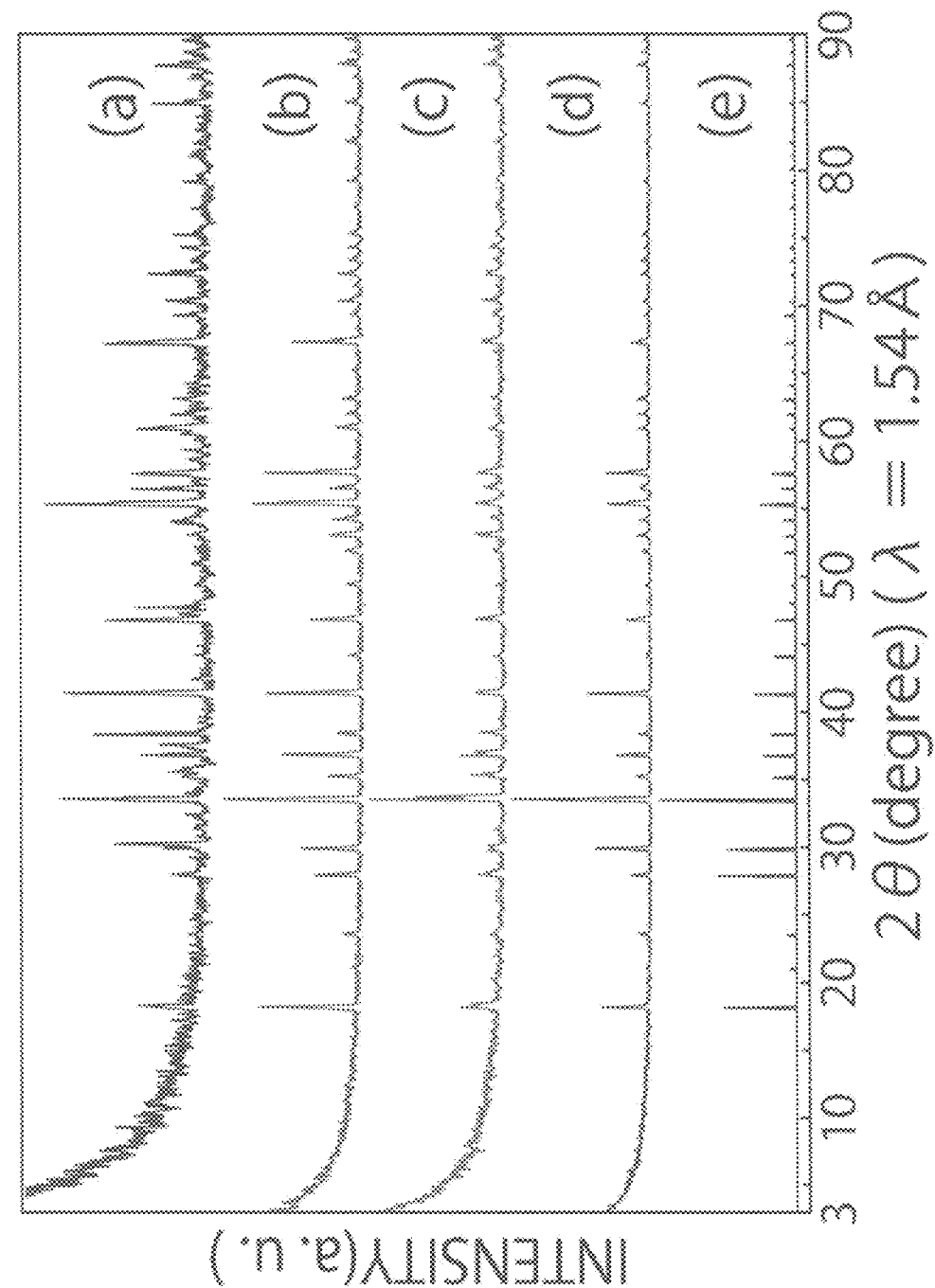
[Figure 4]

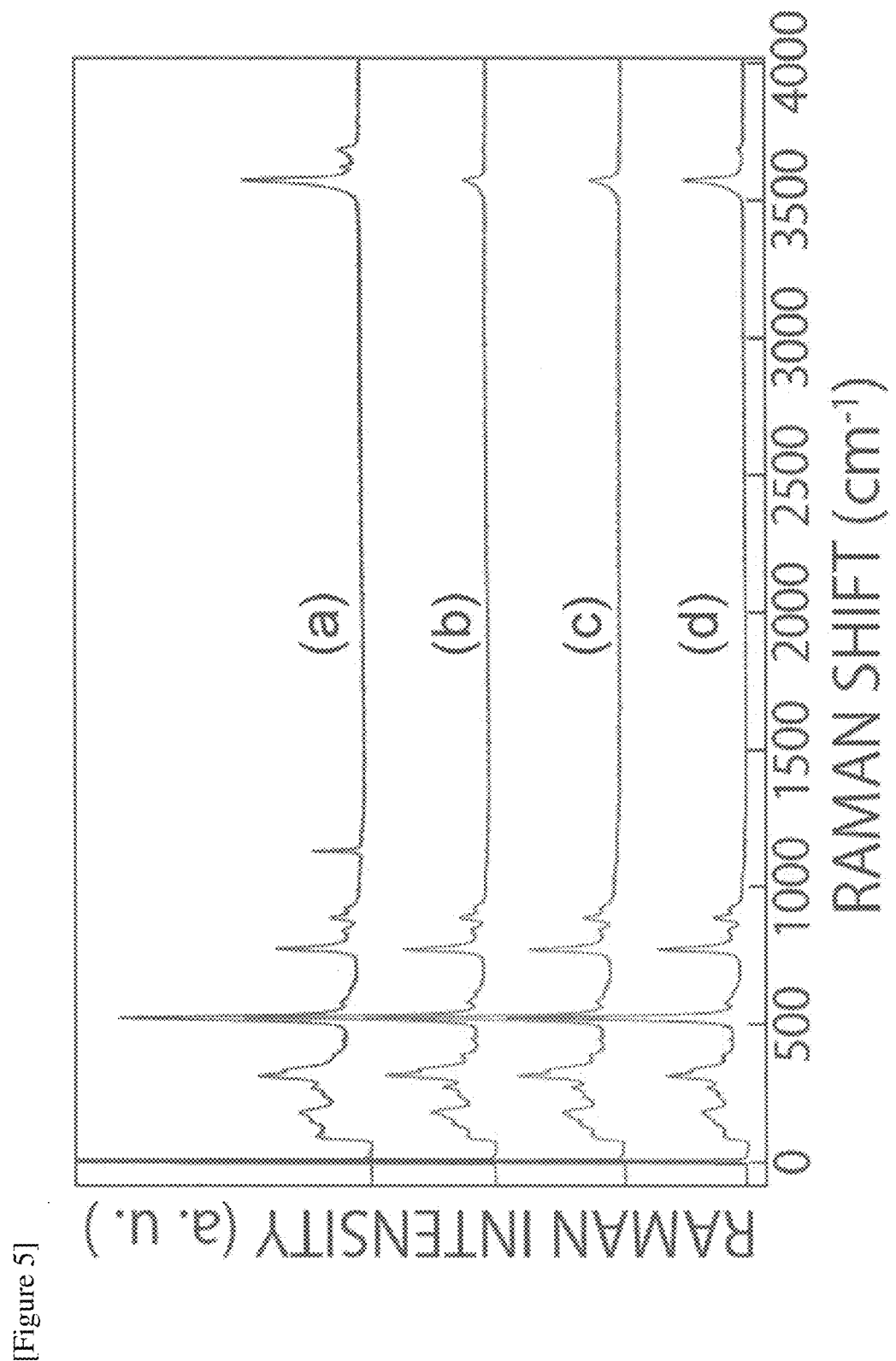
[Figure 5]

[Figure 6]
(a)
(b)
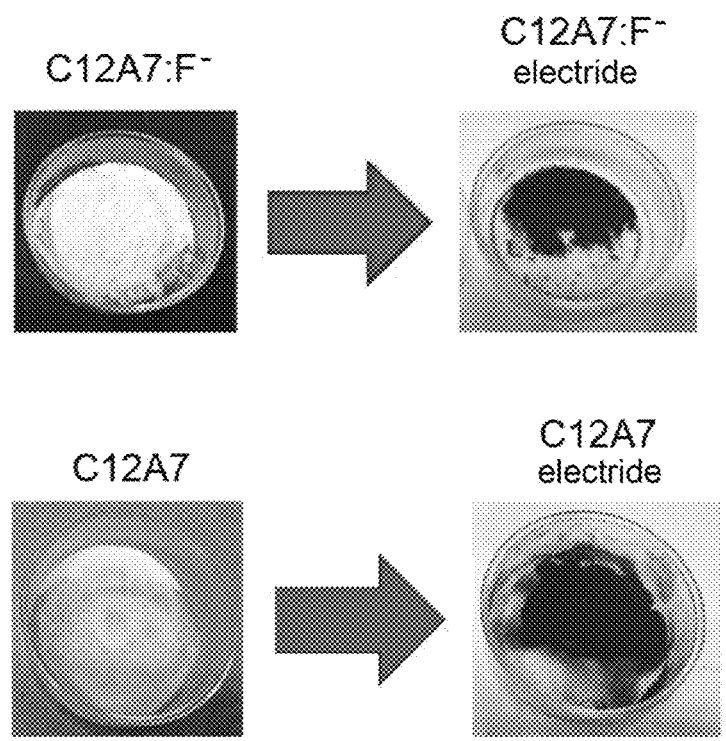

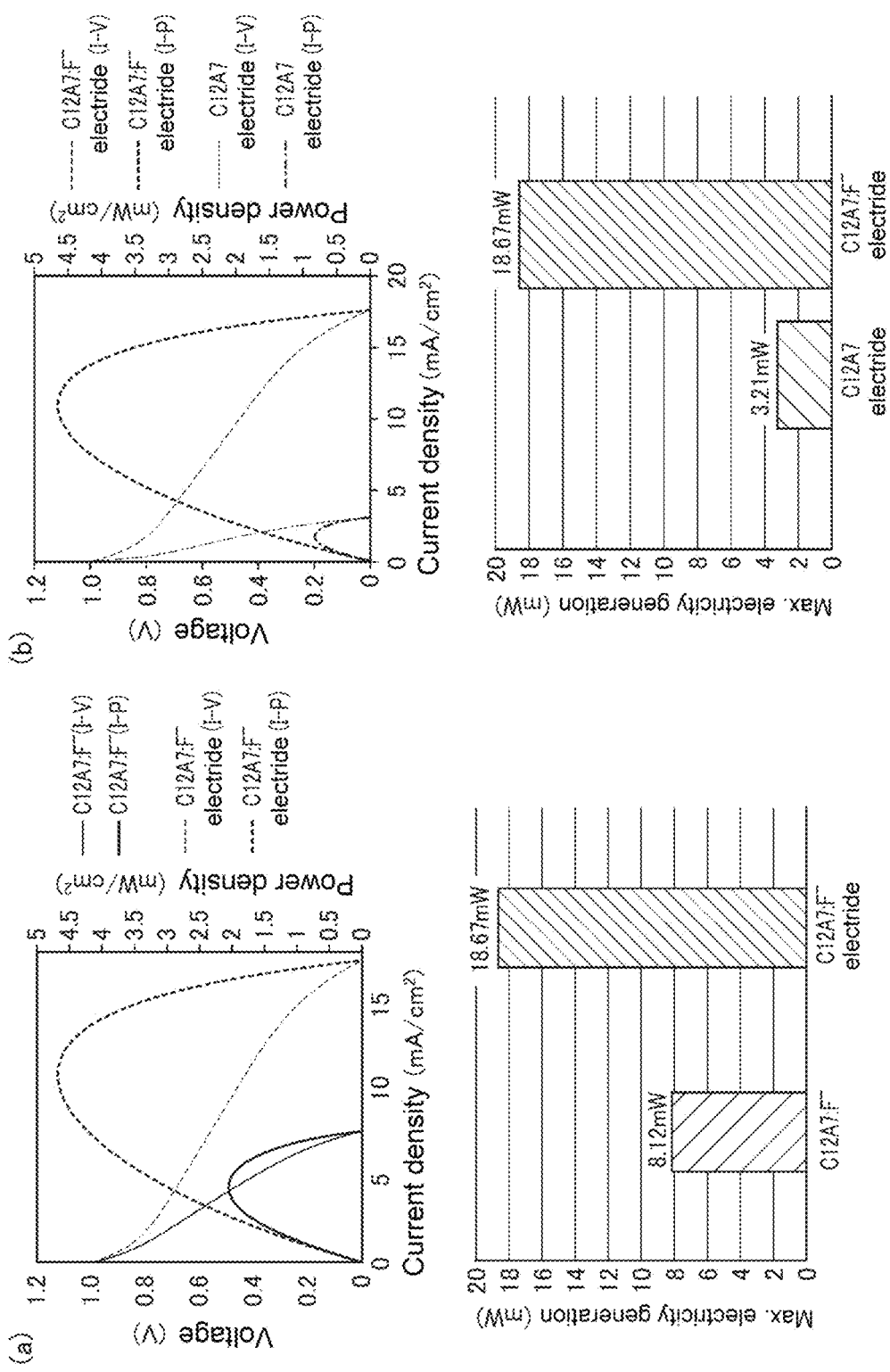
[Figure 7]

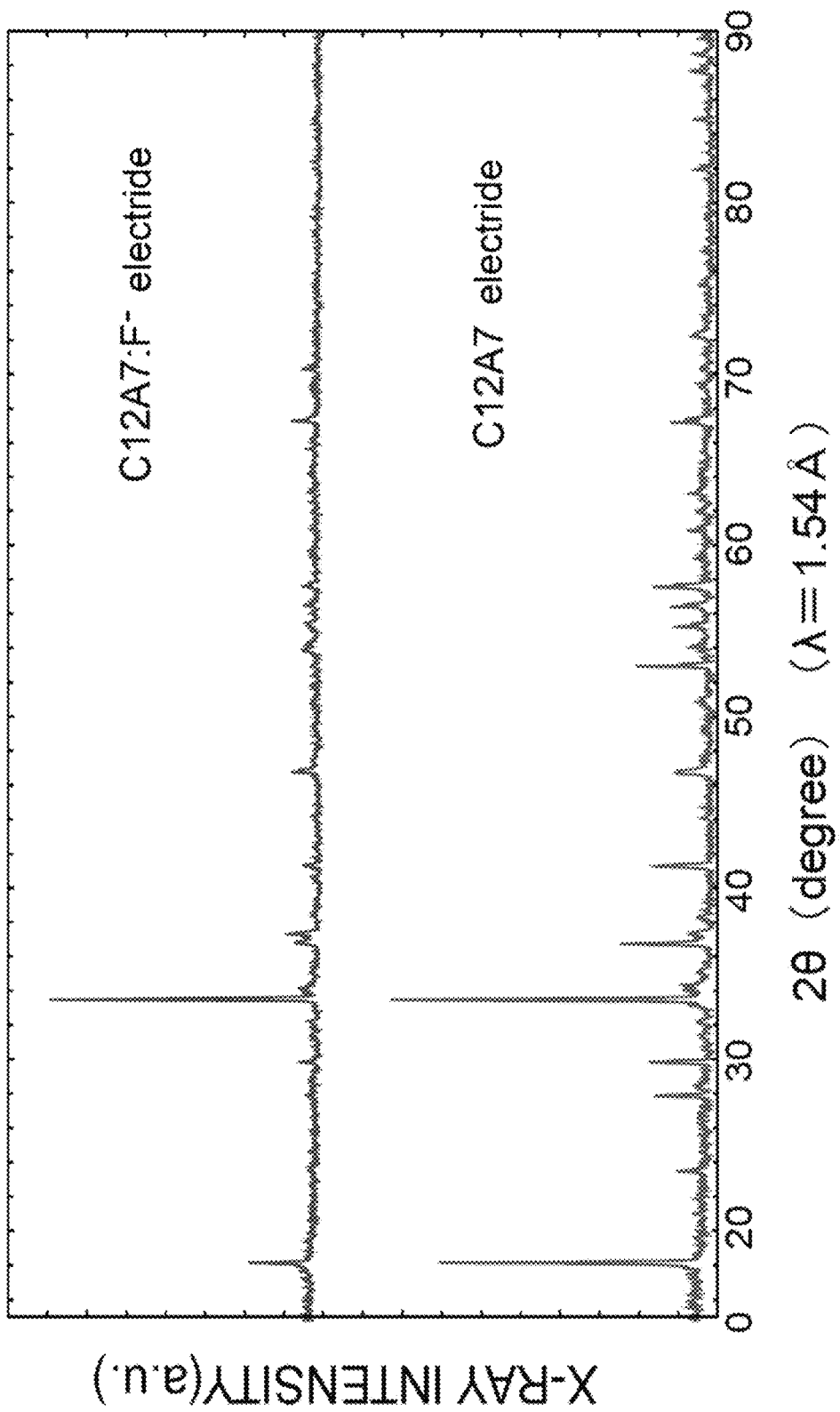
[Figure 8]

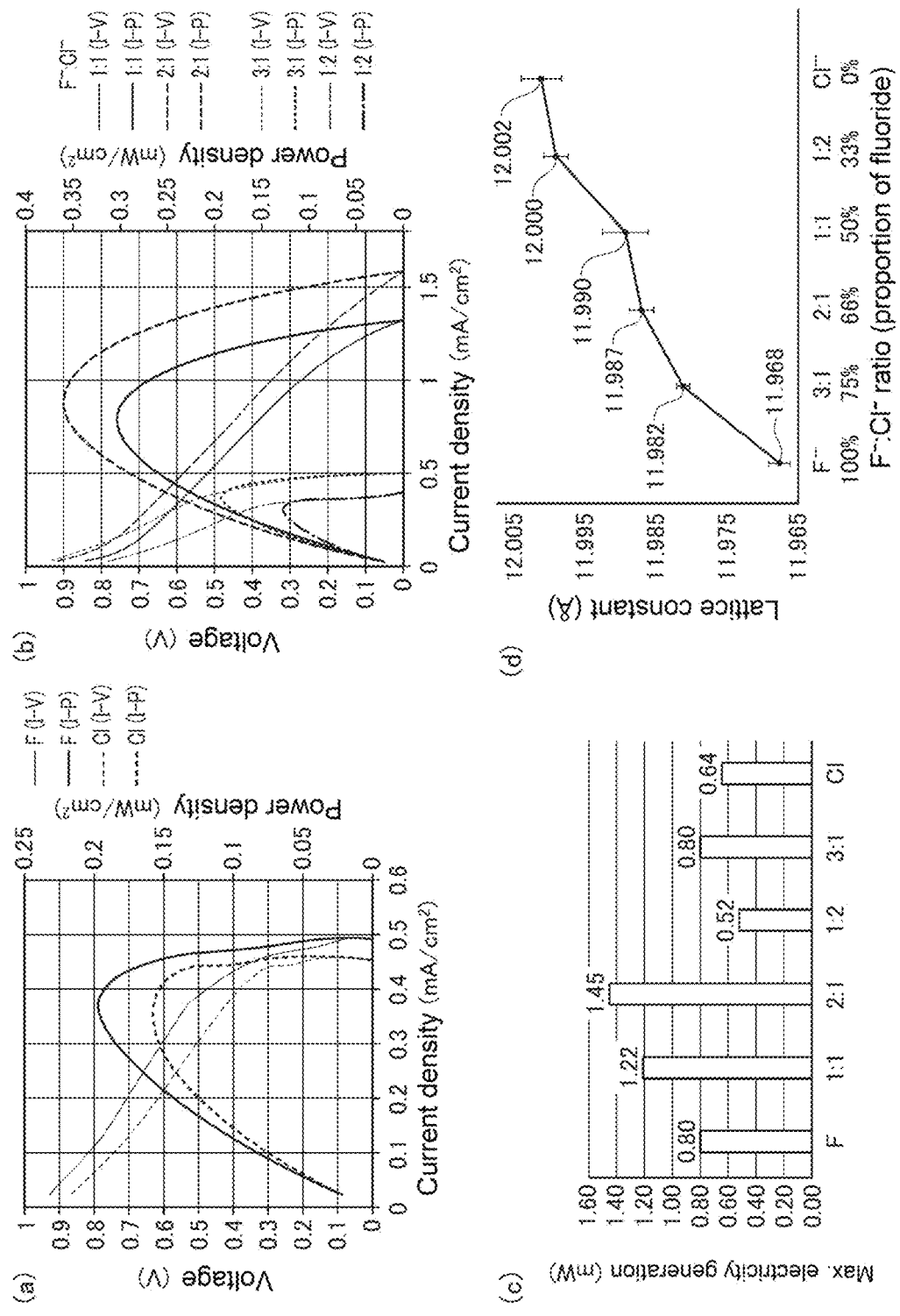
[Figure 9]

FUEL CELL CATALYST COMPOSITION AND FUEL CELL CONTAINING SAME

TECHNICAL FIELD

The present disclosure relates to a fuel cell catalyst composition and a fuel cell containing the same. More specifically, the present disclosure relates to a composition of fuel cell catalyst not requiring platinum, as well as a fuel cell containing the same and a method of producing the same.

BACKGROUND

Fuel cells such as Polymer Electrolyte Fuel Cells (PEFCs) and Phosphoric Acid Fuel Cells (PAFCs) commonly use platinum as a catalyst in both anode and cathode sides. However, platinum, being a precious metal, is expensive and its supply from the deposits is limited. Elimination, or reduction, of use of platinum in the fuel cell catalysts is desired. Therefore, there is a need for developing a catalyst that can replace platinum.

Iron phthalocyanine, nitrogen-containing carbon (carbon alloy), nitrogen-doped carbon and the likes have been drawing attention as platinum substitute catalysts, but currently none of the alternative catalysts have matched platinum with respect to high catalytic property and chemical stability.

C12A7 ($12CaO \cdot 7Al_2O_3$) is an inorganic material which is found in a natural mineral called mayenite and which is also a component of alumina cements. The crystal of C12A7 has a structure in which cage-like skeletons having inner dimensions of about 0.4 nm are connected by sharing a face with each other, with two of the twelve cages within its unit cell hosting oxygen ions $O^{2-}$. Patent Documents 1 and 2 disclose the $[Ca_{24}Al_{28}O_{64}]^{4+}(4e^-)$ crystal obtained by subjecting C12A7 to a high temperature treatment to replace the $O^{2-}$ anions in the crystal cages with electrons $e^-$ to produce an electride. Patent Document 3 mentions a potential use of a particular C12A7 compound as an electrode material for polymer electrolyte fuel cells, but to the present inventor's best knowledge, no document has reported actual electricity generation by using it as a fuel cell catalyst.

REFERENCES

Patent Documents

Patent Document 1: WO 2005/000741
Patent Document 2: WO 2007/060890
Patent Document 3: JP 2003-128415 A

SUMMARY OF INVENTION

Technical Problems

The present disclosure provides a fuel cell catalyst not requiring platinum, and a fuel cell comprising said catalyst.

Solution to Problems

The present inventor discovered that halogen-substituted C12A7s, such as the material in which the $O^{2-}$ anions of C12A7 (having an ideal chemical formula of $[Ca_{24}Al_{28}O_{64}]^{4+}(O^{2-})_2$) are replaced by fluoride anions (the material referred to as C12A7:$F^-$; its ideal chemical formula is $[Ca_{24}Al_{28}O_{64}]^{4+}(4F^-)$) or by chloride anions (the material referred to as C12A7:$Cl^-$), have a catalytic capability at the fuel electrode (anode) or at the air electrode (cathode) of the fuel cells and therefore they can be utilized as alternative catalysts to platinum. It was further discovered that the catalytic property could be further enhanced by subjecting the halogen-substituted C12A7 to a heat treatment under specific conditions. The present invention is based on these findings.

The present disclosure includes the following embodiments.

[1] A fuel cell catalyst composition comprising C12A7:$X^-$ having a structure in which oxygen anions of C12A7 are replaced by halogen (X) anions.

[2] The fuel cell catalyst composition of [1] comprising C12A7:$F^-$ wherein the halogen anion is a fluoride anion.

[3] The fuel cell catalyst composition of [1] or [2] comprising C12A7:$Cl^-$ wherein the halogen anion is a chloride anion.

[4] The fuel cell catalyst composition of any of [1] to [3], further comprising a carbon material mixed with the C12A7:$X^-$.

[5] The fuel cell catalyst composition of [4] wherein the carbon material is carbon black.

[6] A fuel cell comprising an anode, an anode-side catalyst layer, an electrolyte, a cathode-side catalyst layer, and a cathode, layered in this physical order, wherein at least one of the anode-side catalyst layer or the cathode-side catalyst layer comprises the fuel cell catalyst composition of any of [1] to [5].

[7] The fuel cell of [6] wherein the electrolyte is a proton exchange solid polymer membrane or a phosphoric acid aqueous solution.

[$^8$] A method of producing the fuel cell catalyst composition of any of [1] to [5], comprising a step of heat-treating C12A7:$X^-$ at temperature of 1000-1300° C. for at least 20 hours under a nitrogen atmosphere.

[9] The method of [8], further comprising a step of preparing the C12A7:$X^-$ by sintering a mixture of $CaCO_3$, $Al_2O_3$, and $CaX_2$.

The present disclosure further includes the following embodiments.

[1] A fuel cell catalyst composition comprising a C12A7:$X^-$ inorganic material having a structure in which oxygen anions of C12A7 are replaced by halogen (X) anions.

[2] The fuel cell catalyst composition of [1] wherein the halogen anion is fluoride anion, chloride anion, or combination of fluoride anion and chloride anion.

[3] The fuel cell catalyst composition of [2] wherein the halogen anion is combination of fluoride anion ($F^-$) and chloride anion ($Cl^-$), wherein the molar ratio of $F^-$:$Cl^-$ is in the range of 1:1-3:1.

[4] An inorganic material which is a C12A7:$X^-$ partially converted to electride, wherein a C12A7:$X^-$ has a structure in which oxygen anions of C12A7 are replaced by halogen (X) anions.

[5] A fuel cell catalyst composition, comprising the inorganic material of [4].

[6] The fuel cell catalyst composition of any of [1] to [3] or [5], further comprising a carbon material mixed with the inorganic material.

[7] The fuel cell catalyst composition of [6] wherein the carbon material is carbon black.

[8] A fuel cell comprising an anode, an anode-side catalyst layer, an electrolyte, a cathode-side catalyst layer, and a cathode, layered in this physical order, wherein at least one of the anode-side catalyst layer or the cathode-side catalyst layer comprises the fuel cell catalyst composition of any of [1] to [3] or [5] to [7].

[9] A method of producing the fuel cell catalyst composition of any of [1] to [3], comprising a step of heat-treating C12A7:X$^-$ at temperature of 1000-1300° C. for at least 20 hours under a nitrogen atmosphere.

[10] A method of producing the inorganic material of [4] or the fuel cell catalyst composition of [5], comprising: a step of placing C12A7:X$^-$ and a metal selected from calcium or titanium inside the same reactor vessel and vacuum-sealing the reactor vessel; and a step of heating the reactor vessel to a temperature at which the metal vaporizes.

Advantageous Effects of Invention

The fuel cell catalyst compositions of the present embodiments do not require use of the rare elements and can be produced from inexpensive materials, can work as catalysts at anode, cathode, or both, of the fuel cells, and are also chemically stable. They are thus suitable for practical applications in the fuel cells.

Electride conversion of C12A7 requires a sintering process of an extended period of time and is also technically challenging, but the halogen-substituted C12A7 and the materials derived from it according to the present disclosure can be produced comparatively easily. Also, the fuel cell catalyst composition according to the embodiment of the present disclosure can exhibit a catalytic activity which may surpass that of a C12A7 electride.

BRIEF DESCRIPTION OF DRAWINGS

FIG. 1 shows electricity generation observed when hydrogen was supplied to the fuel cells containing the "as-is" C12A7:F$^-$ as a catalyst in the hydrogen electrode side (left) or in the oxygen electrode side (right).

FIG. 2 shows current-voltage curves showing improvement of the fuel cell performance obtained when C12A7:F$^-$ heat-treated under a nitrogen atmosphere was used as a hydrogen electrode-side catalyst, compared to when as-is C12A7:F$^-$ was used.

FIG. 3 shows electric power curves showing improvement of the fuel cell performance obtained when C12A7:F$^-$ heat-treated under a nitrogen atmosphere was used as a hydrogen electrode-side catalyst, compared to when as-is C12A7:F$^-$ was used.

FIG. 4 shows results of X-ray diffraction analysis of C12A7 and C12A7:F$^-$.

FIG. 5 shows results of Raman spectroscopy analysis of C12A7 and C12A7:F$^-$.

FIG. 6(a) shows one embodiment of the reactor vessel for converting the C12A7:X$^-$ sample to an electride. (b) shows blackening of the samples as a result of the electride conversion treatment.

FIG. 7(a) is data showing further improvement of the fuel cell catalyst performance by the electride conversion treatment of C12A7:F$^-$. The top panel shows current-voltage (I-V) curves and current-power (I-P) curves, and the bottom panel shows graphs of maximum electrical power. The data of (b) show that such superior catalytic performance was unique to the electride conversion treatment for C12A7:X$^-$; with the same treatment for C12A7 giving limited effect.

FIG. 8 shows results of X-ray diffraction analysis of the C12A7:F$^-$ subjected to the electride-conversion treatment and the C12A7 subjected to the same treatment.

FIG. 9(a) shows electricity generation by the fuel cells containing C12A7:X$^-$ as a fuel electrode-side catalyst wherein the halogen (X) ions included in the solid solutions were fluorine (F) ions or chlorine (Cl) ions. (b) compares electricity generation of multi-anion-substituted C12A7s in which the F$^-$:Cl$^-$ ratios (i.e., the ratios of CaF$_2$ and CaCl$_2$) used for sintering were varied between 1:2 and 3:1. (c) is a graph comparing the maximum electricity generation measured in the experiments of (a) and (b). (d) shows lattice constants measured for the C12A7:X$^-$ inorganic materials comprising F$^-$ and/or Cl$^-$ at different ratios.

DESCRIPTION OF EMBODIMENTS

In the present disclosure, the symbol "-" used to express a numeric range means that the numbers recited before and after the symbol are included in the range as the lower and the upper limits, respectively. It should be understood that where multiple possible numeric ranges are recited separately, as in "A-B" and "C-D", those ranges which combine the lower or upper limit of the one range with the upper or lower limit of another range (e.g., "A-D" and "C-B") are also possible. When something is said to "comprise" element E, for example, it should be understood that it can include an embodiment in which said something comprises not only element E but also other element(s), as well as an embodiment in which said something does not comprise other elements than element E (i.e., it consists of element E).

In one aspect, the present disclosure provides a catalyst composition for fuel cell, the composition comprising C12A7:X$^-$ having a structure in which oxygen anions of C12A7 are replaced by halogen anions. X represents a halogen atom and X$^-$ a halogen anion. In the present disclosure, for the sake of convenience, C12A7:X$^-$ is also called a C12A7:X$^-$ inorganic material, and this and the C12A7:X$^-$-derived electride discussed below are collectively called C12A7:X$^-$-based inorganic materials. C12A7 is usually prepared by sintering a mixture of CaCO$_3$ and Al$_2$O$_3$. C12A7:X$^-$ can be prepared by adding CaX$_2$ to the mixture, taking into account the molar ratio, before sintering (J. Phys. Chem. C 2008, 112, 19061-19068). Alternatively, C12A7:X$^-$ can be prepared also by mixing CaX$_2$, taking into account the molar ratio, to a pre-formed C12A7 and then sintering the mixture (Journal of the Chemical Society of Japan, 1990, (3), p. 305-311). CaX$_2$ is preferably included in the sintering at a theoretical molar ratio corresponding to four X$^-$s per unit cell of C12A7. By these methods of preparation, at least 80% (and up to 100%, or less than 100%) of the oxygen anions of C12A7 may be replaced by the halogen anions. C12A7:X$^-$ of the present embodiment is typically in a powder form, and typically presents a white color.

X is preferably fluorine or chlorine and more preferably fluorine. That is, in the composition of the present embodiment, C12A7:X$^-$ is preferably C12A7:F$^-$, C12A7:Cl$^-$, or a combination thereof, and is more preferably C12A7:F$^-$.

In other words, the halogen anions may be preferably fluoride anions, chloride anions, or a combination of fluoride anions and chloride anions. When the halogen anions are a combination of fluoride anions (F$^-$) and chloride anions (Cl$^-$), the molar ratio of F$^-$:Cl$^-$ is still more preferably 1:1-3:1, and especially preferably 1:1-2.5:1. Inclusion of F$^-$ and Cl$^-$ at these ratios may result in improvement of the catalytic property compared to when either of the two is included alone. By adjusting the ratio between different CaX$_2$s (CaF$_2$ and CaCl$_2$)) included in the sintering of C12A7:X$^-$, the ratio of the halogen anions in the solid solution can be adjusted.

In a further aspect, the present disclosure provides an inorganic material obtained by partially converting C12A7:X$^-$, which has the structure of C12A7 with the oxygen anions replaced by halogen (X) anions, into an electride. That is, a C12A7:X⁻-based inorganic material is provided in which C12A7:X⁻ is converted to a partial electride. The halogen anions can be, as described above, fluoride anions, chloride anions, or combination of fluoride anions and chloride anions. This inorganic material, in which C12A7: X⁻ is partially converted to electride, is distinguished from the standard C12A7 electride represented by the formula $[Ca_{24}Al_{28}O_{64}]^{4+}(4e^-)$, in that the former has replaced some anions with e⁻ but still retains X⁻. It is speculated that during the electride conversion treatment of C12A7:X⁻, trace amounts of $O^{2-}$ and other non-halogen anions included in the C12A7:X⁻ get more preferentially replaced by e⁻ than X⁻ does, leaving at least some and perhaps majority of the X⁻ behind.

The inorganic material in which C12A7:X⁻ is partially converted to electride can be produced by sintering C12A7: X⁻ in a vacuum in the presence of metallic calcium or metallic titanium at a temperature at which this metal vaporizes. More specifically, first, C12A7:X⁻ and the metallic calcium are placed inside the same reactor vessel, and the reactor vessel is then vacuum-sealed (metallic titanium can also be used instead of metallic calcium). At this step, it is preferable, for the purpose of separating the target product, to place the C12A7:X⁻ and the metal in the reactor vessel such that they do not come into contact with each other, i.e., they do not mix with each other. For example, as shown in FIG. 6(a), C12A7:X⁻ can be placed in one of the tubular spaces of the reactor vessel, whose shape has two thick tubular spaces connected by a thin channel, and the metallic calcium can be placed in the other tubular space, and then the whole reactor vessel is vacuumized inside and sealed. For increasing the reaction efficiency, the C12A7:X⁻ sample is provided preferably in a form having increased surface areas, especially preferably in a powder form, when placed inside the reactor vessel.

Subsequently, the reactor vessel is heated to a temperature at which said metal is vaporized. The temperatures at which the metal is vaporized under the reduced pressure environment are either known to or can be determined as needed by a person skilled in the art. For example, for metallic calcium, a heating temperature of 600-800° C. may be suitable. 680-720° C. may be especially preferable, and 700° C. may be most preferable. A temperature of no higher than 1200° C., especially no higher than about 800° C. is preferable because the halogen ions are relatively stable and tend to remain in the C12A7 crystal at such temperature. If the metallic calcium-containing part and the C12A7:X⁻ sample-containing part of the reactor vessel are sufficiently far apart and can be heated at different temperatures, it is preferable to heat the former at 680-720° C. (or 700° C.) and the latter at a higher temperature such as 780-820° C. (or 800° C.) because this may suppress unnecessary solidification of the vaporized calcium near the sample.

Inside one common reactor vessel, the oxygen anions freed from C12A7:X⁻ by the heating may be readily used for oxidizing the vaporized metal, and the replacement of the anions with e⁻ is facilitated at the C12A7:X⁻ side. When electride conversion is progressed sufficiently, the usually white C12A7:X⁻ may turn black. Reaction efficiency may be further improved by shuffling the sample (e.g., by rocking the reactor vessel) to expose the sample to the vapor during its reaction with the vaporized metal.

The time for heating the reactor vessel (i.e., the time for sintering C12A7:X⁻ in vacuo in the presence of the metal) is typically at least 24 hours, for example 40-240 hours, and preferably 72-100 hours. Material and shape of the reactor vessel can be selected by a person skilled in the art as appropriate based on ordinary knowledge. For example, a quartz tube closed at both ends and having a thinner central portion, as shown in FIG. 6(a), is suitable. Quartz tubes can be processed into any shapes by applying gas burner flame, while they can also have sufficient heat resistance to resist breakage at the typical reaction temperatures described above.

The inorganic material in which C12A7:X⁻ is partially converted to electride can provide an excellent catalyst for fuel cells. Thus, in one embodiment, a fuel cell catalyst composition comprising this inorganic material is provided. In another embodiment, a method of producing the inorganic material or a fuel cell catalyst composition comprising the same is provided, wherein the method comprises a step of sintering C12A7:X⁻ in vacuo in the presence of the metal as described above to obtain the inorganic material.

Preferably, the compositions of the various embodiments described above further comprise an electrically conductive carbon material which is mixed with any of the C12A7:X⁻-based inorganic materials. Examples of this carbon material include, but are not limited to, carbon black, mesocarbon microbeads, graphite, glassy carbon powder, carbon nanotube, carbon nanohorn, and carbon nanofiber. These carbon materials are usually in a powder form. Carbon black is an especially suitable carbon material. The mix ratio by weight of C12A7:X⁻-based inorganic material to carbon material may be for example 10:1-1:10, preferably 5:1-1:3, and more preferably 3:1-1:1. Thus, in one aspect, the method of producing a fuel cell catalyst composition may comprise mixing a C12A7:X⁻-based inorganic material with a carbon material as described in this paragraph.

In another aspect, the present disclosure provides a fuel cell comprising an anode, an anode-side catalyst layer, an electrolyte, a cathode-side catalyst layer, and a cathode, which are layered in this physical order. This basic construction (the layered structure which is also called MEA (Membrane Electrode Assembly) for fuel cells is well known in the art, but the fuel cell of the present embodiment is characterized in that either or both of the anode-side catalyst layer and the cathode-side catalyst layer comprise any of the fuel cell catalyst compositions described herein above. The other catalyst layer, i.e., the catalyst layer that does not comprise the fuel cell catalyst composition of the above-described embodiment, may comprise a conventional catalyst such as platinum on carbon. Also, a fuel cell catalyst composition of the above-described embodiment and a conventional catalyst may be included in a same catalyst layer in combination.

The fuel for the fuel cells may be for example hydrogen, natural gas, or methanol. Hydrogen is especially preferable.

The electrolyte in the present embodiments may be a proton exchange solid polymer membrane or a phosphoric acid aqueous solution. The former provides a polymer electrolyte fuel cell and the latter provides a phosphoric acid fuel cell. The fuel cell of the embodiment is more preferably a polymer electrolyte fuel cell. An especially preferable example of a proton exchange solid polymer membrane is a Nafion membrane. As well known to those skilled in the art, Nafion is a substance having a tetrafluoroethylene backbone and perfluoro side chains with sulfonic acid groups, and is a copolymer of tetrafluoroethylene and perfluoro [2-(fluorosulfonylethoxy) propylvinylether]. For the phosphoric acid aqueous solution electrolyte in the phosphoric acid fuel cell, a solid matrix including silicon carbide or the like is typically impregnated with the solution to be incorporated into the above-described layered structure.

Materials suitable for anodes and cathodes of the fuel cells are known to a person skilled in the art. For example, carbon papers and carbon fiber cloths are especially suited from the viewpoint of gas permeability, electrical conductivity, chemical stability, etc.

In a specific example, a fuel cell of the present embodiment can be produced by a method including the following process: a fuel cell catalyst composition in a powder form which is a mixture of the C12A7:X$^-$-based inorganic material and a carbon material (e.g., carbon black) is dispersed in a solvent (e.g., butyl acetate; a Nafion solution may be added) and applied on the surface of one carbon paper, and the same fuel cell catalyst composition (or alternatively platinum on carbon) is similarly dispersed in a solvent and applied on the surface of another carbon paper, and a Nafion membrane is sandwiched by these two catalyst-coated carbon papers to form a layered structure (with each of the catalyst-coated sides facing the Nafion membrane), and this is then heat-compressed.

In another aspect, the present disclosure provides a method of producing a fuel cell catalyst composition. An embodiment of this method comprises a step of heat-treating C12A7:X$^-$ at a temperature of 1000-1300° C. under a nitrogen atmosphere for at least 20 hours. The temperature of the heat treatment is preferably 1150-1250° C., or 1150-1200° C., and more preferably 1200±5° C. The time for the heat treatment may be for example 20-96 hours, preferably 24-72 hours, and more preferably 36-60 hours. It is preferable that alkali metal or alkali earth metal be not substantially present in the environment of the heat treatment. Not substantially present means not added intentionally to the environment.

The methods of the present embodiments may further comprise, prior to the step of heat-treating C12A7:X$^-$ under the nitrogen atmosphere or prior to the step of converting C12A7:X$^-$ to electride as described above, a step of preparing the C12A7:X$^-$. Preparing the C12A7:X$^-$ can be achieved by sintering a mixture of $CaCO_3$, $Al_2O_3$, and $CaX_2$. Taking into account the theoretical molar ratio between Ca, Al, and X$^-$ in the final C12A7:X$^-$, $CaCO_3$, $Al_2O_3$, and $CaX_2$ in this step are mixed preferably at the molar ratio of 11:7:1. This means, when X is F for example, these materials are mixed at the ratio by weight of 7.051 g:4.571 g:0.500 g. The sintering temperature is preferably in the range of from 1200° C. to lower than 1415° C., and more preferably 1300-1400° C. The sintering time may be for example 2-96 hours, preferably 24-72 hours, and more preferably 36-60 hours. Alternatively, C12A7:X$^-$ may also be prepared by mixing and sintering a pre-formed C12A7 with $CaX_2$.

The method of the present embodiment may further comprise, following the production of the fuel cell catalyst composition as described above, a step of producing an MEA or a fuel cell using the fuel cell catalyst composition.

EXAMPLES

Example 1

In this Example, in order to investigate the potential use of C12A7:F$^-$, whose structure consisting of C12A7 with the oxygen ions replaced by fluoride anions, as an alternative to a platinum-based catalyst, a polymer electrolyte fuel cell having C12A7:F$^-$ in the catalyst layer was produced and its ability to generate electricity was measured.

Production of C12A7:F$^-$ and C12A7

$CaCO_3$ and $Al_2O_3$ and $CaF_2$ in powder forms were mixed at a molar ratio of 11:7:1 (7.051 g:4.571 g:0.500 g) and stirred with a stirrer for 30 minutes. This mixture was sintered in the air at 1350° C. for 48 hours by using a high temperature Muffle furnace to prepare C12A7:F$^-$ which was white powder. Separately, a mixture of $CaCO_3$ and $Al_2O_3$ at a molar ratio of 12:7 (5.048 g:3.000 g) was similarly sintered to prepare C12A7. Still separately, $CaCl_2$) was used in place of $CaF_2$ above, to prepare C12A7:Cl$^-$.

During the sintering described above, the temperature inside the furnace reached 1350° C. within 4 hours of the start of temperature elevation, and this temperature was maintained for 48 hours, before it was cooled down to room temperature by natural cooling. Below, the C12A7:F$^-$ sample obtained this way will be referred to as "as-is", meaning that it remains in the unmodified condition as it was prepared.

Another sample was prepared by further heat-treating the as-is sample above under a nitrogen atmosphere at 1200° C. for either 24 hours or 48 hours. The sample after this heat treatment under the nitrogen atmosphere remained a white powder in its appearance.

Production of MEA and Fuel Cell

For the catalyst layers, a platinum-on-carbon catalyst (obtained from Tanaka Precious Metals) and a mixture of the above C12A7:F$^-$ and carbon black (1:1 ratio by weight) were used in the cathode (oxygen electrode) side and in the anode (fuel electrode) side, respectively. Between the two catalyst layers, a Nafion membrane which is a solid polymer electrolyte was sandwiched, and carbon papers were layered as electrodes on the outer faces of the catalyst layers. The whole layers were heat-compressed by a compact heat press machine to produce a membrane/electrode assembly (MEA) which is a central structure of the fuel cell. The surface area of the MEA was 23×23 mm$^2$.

The MEA was placed between two silicone gaskets, which was in turn placed between two carbon separators, which was in turn placed between two acryl resin cell stack members to produce a fuel cell. Also, regarding the catalyst layers, an alternative fuel cell was produced in which the platinum-on-carbon and the C12A7:F$^-$/carbon black at the oxygen electrode side and the fuel electrode side were reversed.

Measurement of Fuel Cell Activity

Under a hydrogen gas flow rate of 3 cc/min, electrical current was measured by using a source meter while varying the voltage applied to the fuel cells. Electric power was calculated from the result of the measurement. FIG. 1 shows Current-Voltage curves and Power curves obtained by using the "as-is" C12A7:F$^-$ as a hydrogen electrode catalyst (left) and an oxygen electrode catalyst (right). As shown, electric powers of several mWs were detected in this experimental system, demonstrating that C12A7:F$^-$ can function as a catalyst in the anode side as well as in the cathode side of a fuel cell.

On the other hand, in this experimental system, the fuel cell using as catalyst a conventional C12A7, which had not been modified to substitute fluoride, failed to generate electrical power. In this experimental system, the reference fuel cell using a platinum catalyst at both electrodes produced maximum electrical power of up to about 25 mW. Further, in a preliminary experiment, the fuel cell using the C12A7:F$^-$ catalyst was able to show cell performance exceeding that of a fuel cell using an electride-converted C12A7 catalyst under the same condition. (These data are not shown in the figures. As for comparison with the electride-converted C12A7, the results of the separate experiments conducted independently will be described in Example 2.)

While it was shown that the "as-is" C12A7:$F^-$ catalyst can contribute to electricity generation as described above, it was also observed that the catalytic activity can be further improved by heat-treating the as-is C12A7:$F^-$ under a nitrogen atmosphere. FIGS. 2 and 3 show the improvement of the fuel cell performance obtained when the hydrogen electrode-side catalyst used the C12A7:$F^-$s heat-treated under the nitrogen atmosphere, compared to when the catalyst used the as-is C12A7:$F^-$. The mechanism of this improvement is not clear, but the possibilities speculated on include that an increase of $OH^-$ originating from the attached water molecules ($\frac{1}{2} O^{2-}+H_2O \rightarrow 2OH^-$) during the heat treatment (see below) contributed to the improved catalytic effect, and/or that $O^{2-}$ or $OH^-$ was replaced by $e^-$ through the heat treatment and these electrons contributed to the catalytic effect. FIGS. 2 and 3 also show that the electricity generated became greater as the duration of hydrogen supply became longer. This result may be possibly related to an increase in the cell temperature, an increase in the moisture content, etc. In the cell which generated electricity the best; the amount of electricity generation reached about ¼th of that of the reference cell which used a platinum catalyst on both cathode and anode.

Similarly, C12A7:$Cl^-$ having $Cl^-$ instead of $F^-$ was also confirmed to have a catalytic activity albeit for lower electricity generation compared to the $F^-$ counterpart. Results of a separate experiment conducted independently will be described in Example 3.

Structural Analysis of C12A7:$F^-$

The analysis was conducted with X-ray diffraction and Raman spectroscopy for the C12A7:$F^-$ in which the oxygen ions of C12A7 were replaced by fluoride ions. Shown in FIGS. 4 and 5 are: as-is C12A7 sample (a); as-is C12A7:$F^-$ sample (b); C12A7:$F^-$ sample of (b) heat-treated for 24 hours under an $N_2$ atmosphere (c); C12A7:$F^-$ sample of (b) heat-treated for 48 hours under an $N_2$ atmosphere (d); and a theoretical simulation of C12A7:$F^-$ (e).

FIG. 4 shows the X-ray diffraction pattern of each sample. It is speculated that the fluoride-substituted C12A7:$F^-$ receiving the heat-treatment under a nitrogen atmosphere underwent some change, e.g. in anion positioning within the crystal cages, and the changes in the relative intensities of Bragg peaks were observed as a result of this.

FIG. 5 represents the Raman spectra. No significant differences in the spectra were observed in the low energy ranges below 1000 $cm^{-1}$. The peak seen near 1130 $cm^{-1}$ for the C12A7 sample (a) corresponds to stretching vibration of $O_2$. The peak seen near 3570 $cm^{-1}$ is believed to be related to stretching vibration of $OH^-$, and it could be confirmed that its Raman intensity in C12A7:$F^-$ became relatively larger as the time of heat treatment under the nitrogen atmosphere became longer.

Example 2

In this Example, C12A7:$F^-$ was converted to electride to prepare a C12A7:$F^-$-based inorganic material, and its capability as a catalyst for polymer electrolyte fuel cells was investigated.

First, the amount of calcium fluoride was calculated such that the solid solution will include four $F^-$s per unit cell of C12A7. This was mixed with C12A7 and sintered at 800° C. for 4 hours to produce C12A7:$F^-$. The production of C12A7:$F^-$ was confirmed by the changes in X-ray diffraction and lattice constant. Based on the X-ray diffraction patterns, the lattice constants of the C12A7 sample and the C12A7:$F^-$ sample were measured to be 11.980±0.0007 Å and 11.964±0.0010 Å, respectively.

Next, by working a quartz tube with a gas burner flame, a reactor vessel was prepared whose shape consisted of two tubular spaces connected by a thin channel as shown in FIG. 6(a). In one of the spaces of the reactor vessel C12A7:$F^-$ powder sample or C12A7 powder sample was placed, and in the other space metallic calcium of the same weight was placed, preventing them from mixing with each other. The inside of the reactor vessel was brought to a vacuum condition by a vacuum device and, while in that condition, both ends of the reactor vessel were severed by a gas burner to vacuum-seal the reactor vessel. Subsequently, the reactor vessel was heated by using a three-zone electric furnace such that the sample powder-containing portion was heated to 800° C. and the metallic calcium-containing portion was heated to 700° C., and the sintering was carried out for 72 hours. As a result, the white C12A7:$F^-$ and C12A7 powders turned black as shown in FIG. 6(b). The result is consistent with the previous reports that C12A7 samples became black as the free oxygen ions of C12A7 were progressively replaced by electrons, i.e., as C12A7 was converted to an electride.

Fuel cells were produced essentially as described for Example 1, except that each of the catalyst materials was combined with acetylene carbon black at 4:1 ratio by mass in the fuel electrode-side catalyst layer, and the surface area of the MEA was 20×20 $mm^2$. Hydrogen gas flow rate during the measurement of fuel cell activity was 7 ml/min.

As shown in FIG. 7(a), the electricity generation was significantly greater in the fuel cell using the C12A7:$F^-$-based inorganic material catalyst obtained by converting C12A7:$F^-$ to electride, than in the fuel cell using the C12A7:$F^-$ catalyst. However, such superior catalytic activity was not observed with the material obtained by converting C12A7 itself to electride (FIG. 7(b)), and its catalytic activity was rather lower than that of C12A7:$F^-$ (compare FIGS. 7(a) and (b)). In fact, the inorganic material obtained by converting C12A7:$F^-$ to electride as described above showed largely the same X-ray diffraction peak positions but distinct relative peak intensities, compared to the inorganic material obtained by similarly converting C12A7 to electride (FIG. 8), suggesting that it was not a complete electride but some fluoride ions were remaining. It is believed that since the fluoride ions, unlike the oxygen ions, are not easily freed at the temperature used for the electride conversion treatment above, the trace amounts of non-halogen anions were preferentially replaced by $e^-$ during the electride conversion treatment of the C12A7:$F^-$ sample and the fluoride ions have remained.

Example 3

In this Example, multi-halogen-substituted C12A7:$X^-$s were prepared where the solid solutions included $F^-$ and $Cl^-$ in various ratios. The differences in their relative capability as catalysts for polymer electrolyte fuel cells were investigated.

C12A7:$X^-$s were obtained by sintering the 11:7:1 mixtures of $CaCO_3$, $Al_2O_3$, and $CaX_2$ as in Example 1, except that mixtures of $CaF_2$ and $CaCl_2$) were used for the $CaX_2$ and the sintering condition was 1200° C. for 12 hours. The molar ratios of $CaF_2$ to $CaCl_2$) were varied between 1:1, 2:1, 1:2, and 3:1. The experiment of re-sintering under a nitrogen atmosphere as in Example 1 (with re-sintering time of 48 hours), and the experiment of electride conversion treatment as in Example 2 (with treatment time of 72 or 96 hours), were also carried out. Fuel cells comprising these samples as fuel electrode-side catalysts were produced essentially as in Example 1, except that the surface area of MEA was 20×20 mm$^2$ Hydrogen gas flow rate during the measurement of fuel cell activity was 7 ml/min.

C12A7:X$^-$s having different F$^-$:Cl$^-$ ratios showed mutually similar X-ray diffraction patterns (not shown), but it was confirmed that there was a tendency for the lattice constants to become smaller as the proportion of F$^-$ became larger (FIG. 9(d)). This is consistent with the fact that F$^-$ has a smaller ionic radius than Cl$^-$. Further, the results shown in FIG. 9(a) to (c) demonstrate that the catalytic property may be modulated by modulating the ratio between F$^-$ and Cl$^-$ in C12A7:X$^-$. The C12A7:X$^-$ having a F$^-$ to Cl$^-$ ratio of 2:1, which showed the highest level of electricity generation, was chosen and subjected to the further re-sintering under a nitrogen atmosphere or to the electride conversion treatment. As in the preceding Examples, further improvement in the electricity generation was observed. The maximum level of electricity generation was increased to about 210% by the re-sintering under the nitrogen atmosphere, and increased to about 222% by 96 hours of the electride conversion treatment (not shown in the figures).

The invention claimed is:

1. A fuel cell catalyst composition comprising a C12A7:X$^-$ inorganic material having a structure in which oxygen anions of C12A7 of a formula $[Ca_{24}Al_{28}O_{64}]^{4+}(O^{2-})_2$ are replaced by halogen (X) anions.

2. The fuel cell catalyst composition of claim 1, wherein the halogen anion is fluoride anion, chloride anion, or combination of fluoride anion and chloride anion.

3. The fuel cell catalyst composition of claim 2, wherein the halogen anion is a combination of a fluoride anion (F$^-$) and a chloride anion (Cl$^-$).

4. The fuel cell catalyst composition of claim 3, wherein the molar ratio of F$^-$:Cl$^-$ in the halogen anion is in the range of 1:1-3:1.

5. The fuel cell catalyst composition of claim 1, further comprising a carbon material mixed with the inorganic material.

6. The fuel cell catalyst composition of claim 5, wherein the carbon material is carbon black.

7. A method of producing the fuel cell catalyst composition of claim 1, comprising a step of heat-treating C12A7:X$^-$ at temperature of 1000-1300° C. for at least 20 hours under a nitrogen atmosphere.

8. An inorganic material which is a C12A7:X$^-$ partially converted to electride, wherein a C12A7:X$^-$ has a structure in which oxygen anions of C12A7 of a formula $[Ca_{24}Al_{28}O_{64}]^{4+}(O^{2-})_2$ are replaced by halogen (X) anions.

9. A fuel cell comprising an anode, an anode-side catalyst layer, an electrolyte, a cathode-side catalyst layer, and a cathode, layered in this physical order, wherein at least one of the anode-side catalyst layer or the cathode-side catalyst layer comprises the fuel cell catalyst composition of claim 1.

10. A method of producing the inorganic material of claim 8, comprising: a step of placing C12A7:X$^-$ and a metal selected from calcium or titanium inside the same reactor vessel and vacuum-sealing the reactor vessel; and a step of heating the reactor vessel to a temperature at which the metal vaporizes.

11. A fuel cell catalyst composition, comprising the inorganic material of claim 8.

12. The fuel cell catalyst composition of claim 11, further comprising a carbon material mixed with the inorganic material.

13. The fuel cell catalyst composition of claim 12, wherein the carbon material is carbon black.

14. A method of producing the fuel cell catalyst composition of claim 11, comprising: a step of placing C12A7:X$^-$ and a metal selected from calcium or titanium inside the same reactor vessel and vacuum-sealing the reactor vessel; and a step of heating the reactor vessel to a temperature at which the metal vaporizes.

15. A fuel cell comprising an anode, an anode-side catalyst layer, an electrolyte, a cathode-side catalyst layer, and a cathode, layered in this physical order, wherein at least one of the anode-side catalyst layer or the cathode-side catalyst layer comprises the fuel cell catalyst composition of claim 11.

* * * * *